United States Patent
Mehta et al.

(10) Patent No.: US 10,160,682 B2
(45) Date of Patent: Dec. 25, 2018

(54) INHIBTION OF SILICA SCALE USING HYDROPHOBICALLY-MODIFIED ALKYLENE OXIDE URETHANE COPOLYMER

(71) Applicants: Dow Global Technologies LLC, Midland, MI (US); Rohm and Hass Company, Phiadelphia, PA (US)

(72) Inventors: Somil Chandrakant Mehta, Mumbai (IN); Alain DuFour, Pegomas (FR)

(73) Assignee: Dow Global Technologies LLC, Midland, MI (US)

(*) Notice: Subject to any disclaimer, the term of this patent is extended or adjusted under 35 U.S.C. 154(b) by 75 days.

(21) Appl. No.: 15/129,003

(22) PCT Filed: Apr. 7, 2015

(86) PCT No.: PCT/US2015/024613
§ 371 (c)(1),
(2) Date: Sep. 26, 2016

(87) PCT Pub. No.: WO2015/164067
PCT Pub. Date: Oct. 29, 2015

(65) Prior Publication Data
US 2017/0190603 A1 Jul. 6, 2017

Related U.S. Application Data

(60) Provisional application No. 61/982,966, filed on Apr. 23, 2014.

(51) Int. Cl.
| | |
|---|---|
| *B01D 65/08* | (2006.01) |
| *C02F 101/10* | (2006.01) |
| *B01D 61/04* | (2006.01) |
| *C02F 5/12* | (2006.01) |
| *C02F 1/44* | (2006.01) |

(52) U.S. Cl.
CPC ............ *C02F 5/12* (2013.01); *B01D 61/04* (2013.01); *B01D 65/08* (2013.01); *C02F 1/441* (2013.01); *C02F 1/442* (2013.01); *B01D 2311/04* (2013.01); *B01D 2311/12* (2013.01); *B01D 2321/168* (2013.01); *C02F 2101/10* (2013.01); *C02F 2303/14* (2013.01)

(58) Field of Classification Search
None
See application file for complete search history.

(56) References Cited

U.S. PATENT DOCUMENTS

| | | |
|---|---|---|
| 4,328,106 A | 5/1982 | Harrar et al. |
| 4,510,059 A | 4/1985 | Amjad et al. |
| 4,584,104 A | 4/1986 | Dubin |
| 4,618,448 A | 10/1986 | Cha et al. |
| 4,711,725 A | 12/1987 | Amick et al. |
| 4,849,129 A | 7/1989 | Chen et al. |
| 4,933,090 A | 6/1990 | Gill et al. |
| 5,256,302 A | 10/1993 | Perez et al. |
| 5,271,847 A | 12/1993 | Chen et al. |
| 5,271,862 A | 12/1993 | Freese |
| 5,422,010 A | 6/1995 | Carey et al. |
| 5,510,059 A | 4/1996 | Yuki et al. |
| 5,658,465 A | 8/1997 | Nicholas et al. |
| 5,681,479 A | 10/1997 | Kerr et al. |
| 6,051,142 A | 4/2000 | Roe |
| 6,162,391 A | 12/2000 | Kowata et al. |
| 6,338,803 B1 | 1/2002 | Campbell et al. |
| 6,444,747 B1 | 9/2002 | Chen et al. |
| 7,316,787 B2 | 1/2008 | Hendel et al. |
| 2006/0060816 A1 | 3/2006 | Hendel et al. |
| 2012/0161068 A1 | 6/2012 | Greene et al. |
| 2013/0029894 A1* | 1/2013 | Bettiol ................ C11D 3/1266 510/236 |

FOREIGN PATENT DOCUMENTS

| | | |
|---|---|---|
| EP | 2444432 | 4/2012 |
| JP | 2012149186 | 8/2012 |
| WO | 02/34681 | 5/2002 |
| WO | 2010/005889 | 1/2010 |

OTHER PUBLICATIONS

ACUSOL chemisry.pdf—Dow Answer Center, "Describe the chemistries of ACUSOL rheology modifiers"https://dowac.custhelp.com/app/answers/detail/a_id/12749—accessed Feb. 12, 2018 (Year: 2017).*
Koo, et al., Silica Fouling and Cleaning of Reverse Osmosis Membranes, Desalination 139 (2001) 43-56.
Ning, et al., Chemical Control of Colloidal Fouling of Reverse Osmosis Systems, Desalination 172 (2005) 1-6.
Neofotistou,et al., Use of Antiscalants for Mitigation of Silica Fouling and Deposition: Fundamentals and applications in Desalination Systems, Desalination 167 (2004) 257-272.
Zhang, et al., Synergistic Inhibition Effect of Polyaminoamide Dendrimers and Polyepoxysuccinic Acid on Silica Polymerization, Colloids and Surfaces A: Physicochemical and Engineering Aspects 410 (2012) 159-169.
Amjad, et al., Reverse Osmosis Technology: Fundamentals and Water Applications, The BF Goodrich Company (Fall 1999).
Amjad, et al., A New Antifoulant for Controlling Silica Fouling in Reverse Osmosis Systems, International Desalination Association, World Congress on Desalination and Water Reuse, (Oct. 6-9, 1997) Madrid Spain.

* cited by examiner

*Primary Examiner* — Krishnan S Menon
*Assistant Examiner* — Bradley R Spies

(57) ABSTRACT

A method for inhibiting silica scale formation in an aqueous system by adding a hydrophobically-modified alkylene oxide urethane copolymer anti-scalant to the water used in the aqueous system.

10 Claims, 1 Drawing Sheet

INHIBTION OF SILICA SCALE USING HYDROPHOBICALLY-MODIFIED ALKYLENE OXIDE URETHANE COPOLYMER

FIELD

The invention relates to controlling the formation of silica deposits in aqueous systems.

INTRODUCTION

Problems associated with the formation of silica scale in aqueous systems are a well documented. Depending upon the pH, temperature, silica concentration and presence of salts and polyvalent metal ions in the feed water used in such systems, different types of silica precipitates ("scale") may form. For example, at pH values above 9.5, silica scale is predominantly in the form of metal silicates, whereas colloidal silica (polymerized silica particles) is more common at pH values below 9.5. While generally soluble at concentrations up to 150 mg/L at 25° C. and pH 7.5, the presence of salts and polyvalent metal ions in the feed water can catalyze silica scale formation. Colloidal silica scaling (fouling) is particularly problematic in reverse osmosis systems where concentration polarization at the membrane surface further exacerbates silica scaling. As a consequence, RO systems are often operated at reduced recovery rates (e.g. below 75%) when treating feed waters containing more than 30 mg/l silica.

A variety of products have been promoted for reducing colloidal silica scale formation, e.g., ethylene oxide-propylene oxide copolymers (U.S. Pat. No. 6,051,142 and WO2002/34681), polyacryl-amides, acrylic acid and maleic acid polymers and copolymers, phosphonates and polyphosphates (U.S. Pat. No. 4,933,090), boric acid (U.S. Pat. No. 4,584,104), and AQUAFEED™ Antiscalant and MT 5010 and MT 3100 cleaners available from the Lubrizol Company. See also: Koo et al., Silica Fouling and Cleaning of Reverse Osmosis Membranes, Desalination 139 (2001) 43-56; Ning et al., Chemical Control of Colloidal Fouling of Reverse Osmosis Systems, Desalination 172 (2005) 1-6; Neofotistou et al., Use of Antiscalants for Mitigation of Silica Fouling and Deposition: Fundamentals and applications in Desalination Systems, Desalination 167 (2004) 257-272; Zhang et al., Synergistic Inhibition Effect of Polyaminoamide Dendrimers and Polyepoxysuccinic Acid on Silica Polymerization, Colloids and Surfaces A: Physicochemical and Engineering Aspects 410 (2012) 159-169; Amjad et al., Reverse Osmosis Technology: Fundamentals and Water Applications, The BF Goodrich Company (Fall 1999); and Amjad, et al., A New Antifoulant for Controlling Silica Fouling in Reverse Osmosis Systems, International Desalination Association, World Congress on Desalination and Water Reuse, (6-9 Oct. 1997) Madrid Spain. See also: U.S. Pat. Nos. 4,328,106, 4,510,059, 4,618,448, 4,711,725, 4,849,129, 5,256,302, 5,271,847, 5,271,862, 5,422,010, 5,510,059, 5,658,465, 5,681,479, 5,658,465, 6,162,391, 6,444,747 and US2012/0161068. Despite the development of new anti-scalants, silica scaling continues to be a major challenge for aqueous systems and in particular, reverse osmosis systems.

SUMMARY

In one embodiment the invention includes a method for inhibiting silica scale formation in an aqueous system comprising adding an anti-scalant to water used in the aqueous system, wherein the anti-scalant comprises a hydrophobically-modified alkylene oxide urethane copolymer. In another embodiment, the aqueous system is a reverse osmosis system including a reverse osmosis membrane and the method involves adding the anti-scalant to a source of feed water, and passing the resulting feed water through the reverse osmosis system such that a portion passes through the reverse osmosis membrane to produce a permeate stream having a reduced concentration of silica with the remaining portion of feed water forming a reject stream having a higher concentration of silica. Additional embodiments are described.

DETAILED DESCRIPTION

Figure 1:
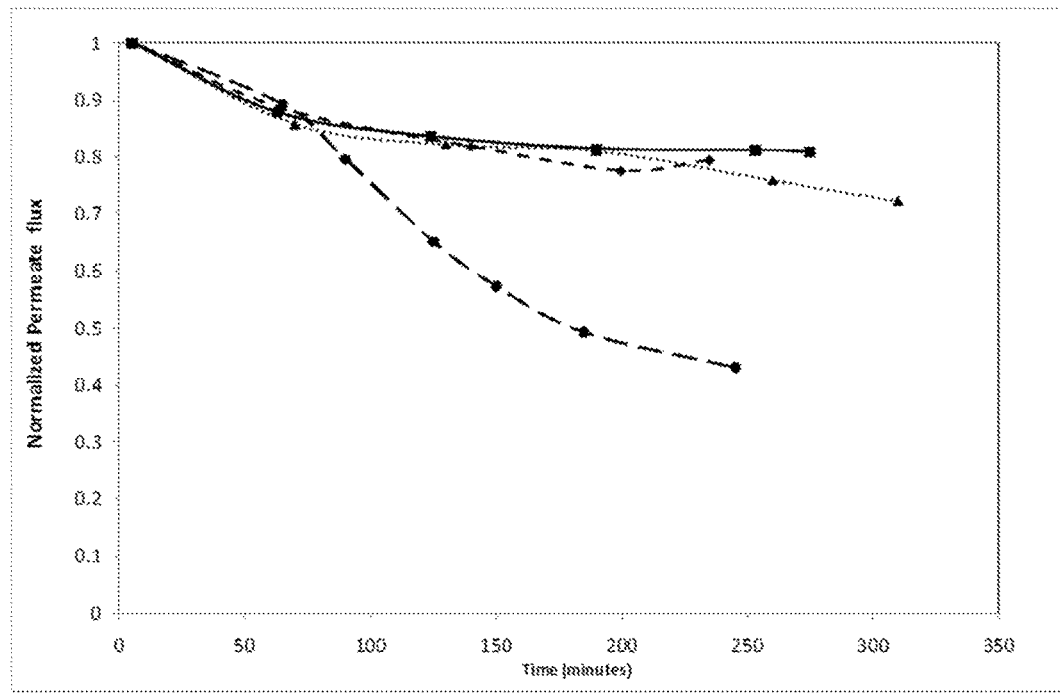
FIGS. 1 and 2 are plots of normalized permeate flux as a function of time for samples described in Example 2.

As used herein, the term "scale" in intended to refer to a solid precipitate without being limited by the underlying formation mechanism, e.g. coagulation, destabilization, polymerization, etc. The term "anti-scalant" refers to substance that inhibits (reduces) the formation of scale and/or the size and/or shape of solid particles. The scalant of particular focus is colloidal or "amorphous" silica.

The anti-scalants of the present invention include hydrophobically-modified alkylene oxide urethane copolymers, i.e. copolymers including both alkylene oxide and urethane groups. The copolymers preferably have a Mw of 1000 to 500,000 Daltons but more preferably 10000 to 100,000 Daltons. The copolymers are preferably non-ionic and water soluble, and may be branched or linear. The copolymers preferably include at least 40 wt %, 50wt %, 85 wt %, 90 wt % and in some embodiments even 95 wt % of alkylene oxide groups along with urethane groups preferably serving as linking groups between blocks of alkylene oxide or as terminal groups. The term "alkylene oxide" is used interchangeable with the term "oxyalkylene" and both collectively refer to units having the structure —(O-A)- wherein O-A represents the monomeric residue of the polymerization reaction product of a $C_{2-4}$ alkylene oxide. Examples include but are not limited to: oxyethylene with the structure —($OCH_2CH_2$)—; oxypropylene with the structure —(OCH($CH_3$)$CH_2$)—; oxytrimethylene with the structure —($OCH_2CH_2CH_2$)—; and oxybutylene with the general structure —($OC_4H_8$)—. Polymers containing these units are often referred to as "polyoxyalkylenes." The polyoxyalkylene units can be homopolymeric or copolymeric. Examples of homopolymers of polyoxyalkylenes include, but are not limited to polyoxyethylene, which contains units of oxyethylene; polyoxy propylene, which contains units of oxypropylene; polyoxytrimethylene, which contains units of oxytrimethylene; and polyoxybutylene, which contains units of oxybutylene. Examples of polyoxy butylene include a homopolymer containing units of 1,2-oxybutylene, —(OCH($C_2H_5$)$CH_2$)—; and polytetrahydrofuran, a homopolymer containing units of 1,4-oxybutylene, —($OCH_2CH_2CH_2CH_2$)—. Alternatively the polyoxyalkylene segments can be copolymeric, containing two or more different oxyalkylene units. The different oxyalkylene units can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene units, and each polymer block contains at least two of the same oxyalkylene units. Oxyethylene is the preferred oxyalkylene segment. The subject copolymer preferably includes a plurality of oxyalkylene segments or blocks having a Mw of from 200 to 10000 and more preferably 2000 to 10000. The oxyalkylene segments are preferably linked by reaction with a multi-functional isocyanate (forming a urethane). The multi-functional isocyanates can be aliphatic, cycloaliphatic, or aromatic; and can be used singly or in admixture of two or more, including mixtures of isomers. Examples of suitable organic polyisocyanates include 1,4-tetramethylene diisocyanate, 1,6-hexamethylene diisocyanate, 2,2,4-trimethyl-1,6-diisocyanato hexane, 1,10-decamethylene diisocyanate, 4,4'-methylenebis (isocyanato-cyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, 1,5-tetrahydronaphthylene diisocyanate, hexamethylene diisocyanate trimer, hexamethylene diisocyanate biuret, and triphenylmethane-4,4',4"-triisocyanate.

Preferred species of copolymers include so-called "HEUR" materials (i.e. hydrophobically modified ethoxylated urethane) conventionally used as rheology modifiers in water-based fluids including cosmetics, paints, detergents, personal care formulations. Commercial examples of such copolymers include ACUSOL™ 880, ACUSOL™ 882, ACRYSOL™ RM-825 from The Dow Chemical Company. Examples of HEUR materials are described in: US2014/0011967, US2013/015819, US2012/0130000, US2009/0318595, U.S. Pat. Nos. 7,741,402, and 4,155,892—the entire subject of which is incorporated herein by reference. HEUR materials are typically built up from water-soluble poly(oxyethylene) segments joined by urethane groups. Hydrophobic end groups may be incorporated by reacting hydrophobic alcohols, amines, or acids with the diisocyanate groups, the resulting hydrophobic group effectively including the hydrophobic residue of the diisocyanate. Alternatively, hydrophobic monoisocyanates may be reacted with terminal poly(oxyethylene) chains. The diisocyanates used to link the water-soluble segments serve as internal hydrophobic groups, if the diisocyanate molecule is large enough and hydrophobic enough, or internal hydrophobes may be efficiently built up by reacting the diisocyanates with hydrophobic active hydrogen compounds, such as diols or diamines. Excess diisocyanate may also be reacted with water to build up hydrophobic blocks.

The present invention is useful in reducing silica scale formation in aqueous systems, such as by way of adding the anti-scalant to the water used in such systems. The amount of anti-scalant added to the water may vary depending upon the temperature and pH of the water along with the concentration of silica, salts and polyvalent metal ions present in the water. In most applications, an amount of from 1 ppm to 1000 ppm, and more preferably from 2 ppm to 100 ppm of the anti-scalant is added or maintained in the water used in the system. The feed water used in such systems typically has a silica content of more than 30 ppm, 50 ppm or even 100 ppm. Examples of applicable aqueous systems include boiler water systems, cooling water systems, evaporator systems, mining systems, geothermal systems, enhanced or tertiary oil recovery systems, paper manufacturing systems, gas scrubber water systems, laundry or and reverse osmosis systems.

In particular regard to a reverse osmosis system, the system includes a semi-permeable membrane module (e.g. spiral wound, hollow fiber, capillary and tubular membrane module or "element"). In a preferred embodiment, the membrane module comprises a spiral wound configuration including one or more reverse osmosis (RO) or nanofiltration (NF) membrane envelops and feed spacer sheets wound around a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions-depending upon the species of divalention. NF membranes also typically reject particles in the nanometer range as well as organic molecules having molecular weights greater than approximately 200 to 500 Daltons. For purposes of the present description, NF and RO are collectively referred to as "RO". In a conventional embodiment, one or more spiral wound elements are serially arranged within a pressure vessel. During operation pressurized feed liquid is introduced into the vessel and passes through the membrane element. The portion of feed water passing through the RO membrane produces a permeate stream having a reduced concentration of salts (and silica) with the remaining portion of feed water forming a reject stream having a higher concentration of salts (and silica). The feed water used in RO systems preferably has a pH less than 9.5, 9, or even 8.5 depending upon the specific application. Silica scale most commonly forms on the membrane surface as a result of silica concentration polarization. However, scaling may also occur along the entire reject stream due to increased silica content (i.e. the reject stream may have silica content of greater than 100 ppm or even 150 ppm). Such scaling is particularly pronounced when operating a reverse osmosis system at the pH values noted above when using feed water sources having a silica content of at greater than 30 ppm, 50 ppm or even 100 ppm. The addition of the subject anti-scalant is effective at inhibiting such scale formation allowing for improved performance (i.e. higher flux, higher recovery rates, less membrane cleaning and replacement, less pre-treatment, etc.).

The subject anti-scalants may be used in combination with other known anti-scalants, anti-coagulants and dispersants including but not limited to: ethylene oxide-propylene oxide copolymers (U.S. Pat. No. 6,051,142 and WO2002/34681), polyacrylamides, acrylic acid and maleic acid polymers and copolymers, polyoxazoline, phosphonates and polyphosphates. One preferred combination is the subject anti-scalant with a known silicate and silica scale inhibitor, ACUMER™ 5000 (carboxylic multi-polymer).

Many embodiments of the invention have been described and in some instances certain embodiments, selections, ranges, constituents, or other features have been characterized as being "preferred." Such designations of "preferred" features should in no way be interpreted as an essential or critical aspect of the invention.

EXAMPLES

Example 1

In order to evaluate the efficacy of various anti-scalants, sample feed water samples were prepared by adjusting the pH of deionized water to 2-3 using HCl. 0.81 g of sodium silicate was then added to the water to bring the $SiO_2$ concentration of to approximately 400 ppm. The pH of the solution was then adjusted to 4-5 be addition of HCl. Various anti-scalants were then added to samples of this test solution and the pH was slowly raised to approximately 8 at 25° C. while the solution was gently stirred and then allowed to stand for approximately 21 hours. The silica remaining in solution after 21 hrs is used as an indicator of the efficacy of the inhibitor for silica scale prevention. The percent silica scale inhibition is calculated as ppm of $SiO_2$ in solution after 21 hrs divided by initial i.e. 400 ppm $SiO_2$ and multiplied by 100. The results are summarized in Table 1. The total weight solids of anti-scalant added to each sample was constant.

TABLE 1

| Anti-scalant | % $SiO_2$ polymer inhibition |
|---|---|
| Acusol ™ 880 (HEUR) | 90 |
| Acrysol ™ RM-845 (HEUR) | 89 |
| Aquazol ™ 50 (poly(2-ethyl-2-oxazoline) | 81 |
| Acumer ™ 5000 (Carboxylic multipolymer) | 50 |
| PEG 600 | 47 |
| Control (no anti-scalant) | 42 |
| Acumer ™ 5000/Acrysol ™ RM-845 (wt ratio: 50/50) | 75 |
| Acumer ™ 5000/Aquazol ™ 50 (wt ratio: 50/50) | 62 |

Example 2

To further evaluate the efficacy of various anti-scalants, several feed water samples were tested using an RO system. More specifically feed water samples were prepared using a stock solution of deionized water pH adjusted to 2-3 by addition of HCl. Individual feed samples were prepared from the stock solution by adding approximately 200 ppm SiO2 (added as sodium silicate pentahydrate). The pH of the feed samples was immediately adjusted to 4-5 by addition of HCl. 50 ppm of various anti-scalant where added along with 300 ppm Ca (added as calcium chloride dihydrate), 250 ppm Mg (added as magnesium chloride hexahydrate) and 150 ppm of bicarbonate (added as sodium bicarbonate). The pH of the samples was then adjusted to approximately 8 by addition of dilute NaOH. Individual feed samples were then pressurized to 100 psi at room temperature and passed through an RO module (Filmtec™ BW-XLE) with concentrate being recycled to the feed sample (correct). Permeate flux of RO module was monitored and normalized permeate flux is reported as a function of time in the plots shown as FIGS. 1 and 2.

Figure 2:
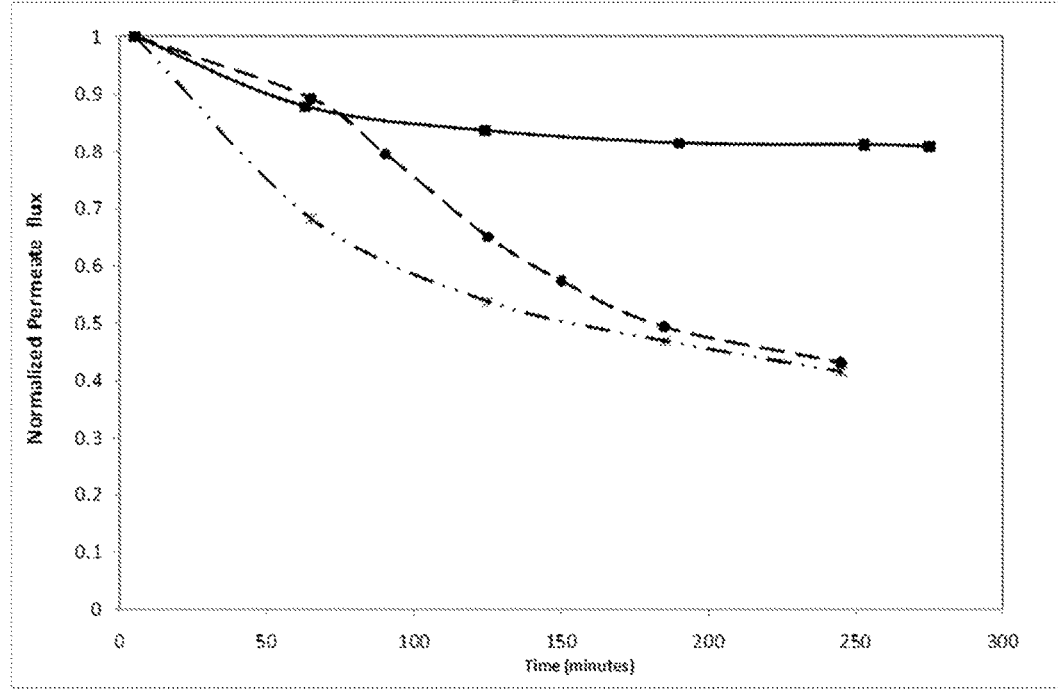

| Legend used in FIGS. 1 & 2 | Anti-sealant |
|---|---|
| ♦ | Acusol ™ 880 (HEUR) |
| ■ | Acumer ™ 5000/Acrysol ™ RM-880 (wt ratio: 50/50) |
| ● | Acumer ™ 5000 (Carboxylic multipolymer) |
| ▲ | Aquazol ™ 50 (poly(2-ethyl-2-oxazoline) |
| ✳ | PEG 400 |

The invention claimed is:

1. A method for inhibiting silica scale formation in an aqueous system, the method comprising:
adding an anti-scalant to water used in the aqueous system, the anti-scalant being added to a source of feed water containing silica, the aqueous system comprising a revere osmosis system including a reverse osmosis membrane; and
passing the resulting feed water through the reverse osmosis system such that a portion passes through the reverse osmosis member to produce a permeate stream having a reduced concentration of silica with the remaining portion of feed water forming a reject stream having a higher concentration of silica,
wherein the anti-scalant comprises a hydrophobically-modified ethoxylated urethane copolymer comprising both ethylene oxide and urethane groups and an hydrophobic end group incorporated by reacting a hydrophobic alcohol, amine, or acid with an isocyanate group.

2. The method of claim 1 wherein the hydrophobically modified ethylene oxide urethane copolymer is nonionic.

3. The method of claim 1 wherein the hydrophobically modified ethylene oxide urethane copolymer comprises at least 50 wt % of ethylene oxide groups.

4. The method of claim 1 wherein the anti-scalant has a Mw of 1,000 to 500,000 Daltons.

5. The method of claim 1 wherein the hydrophobically modified ethylene oxide urethane copolymer comprises a plurality of urethane groups.

6. The method of claim 5 wherein the urethane group links the ethylene oxide group and the hydrophobic end group.

7. The method of claim 1 wherein the water has a pH of less than 9.5.

8. The method of claim 1 wherein the feed water has a pH less than 9 and a silica content of at least 30 ppm, and wherein the reject stream has a silica content of at least 100 ppm.

9. The method of claim 1 wherein from 1 to 1000 ppm of the anti-scalant is added to the water of the aquenous system.

10. The method of claim 1 wherein the anti-scalant has Mw of 10,000 to 100,000 Daltons.

* * * * *